(12) United States Patent
Iyer (10) Patent No.: US 7,274,932 B1
(45) Date of Patent: Sep. 25, 2007

(54) EXPERT SYSTEM FOR TROUBLESHOOTING CELLULAR SITE PROBLEMS

(75) Inventor: Gopal N. Iyer, Boca Raton, FL (US)

(73) Assignee: AT&T BLS Intellectual Property, Inc., Wilmington, DE (US)

(*) Notice: Subject to any disclaimer, the term of this patent is extended or adjusted under 35 U.S.C. 154(b) by 819 days.

(21) Appl. No.: 09/955,817

(22) Filed: Sep. 19, 2001

(51) Int. Cl.
*H04Q 7/20* (2006.01)

(52) U.S. Cl. .............. 455/423; 455/226.1; 455/67.11; 455/446

(58) Field of Classification Search ............... 455/423, 455/226.1, 12.1, 67.1, 424, 446, 67.11; 379/9.03, 379/9.02; 706/908; 714/26
See application file for complete search history.

(56) References Cited

U.S. PATENT DOCUMENTS

| | | | |
|---|---|---|---|
| 4,697,243 A * | 9/1987 | Moore et al. ................. | 706/59 |
| 4,972,453 A | 11/1990 | Daniel, III et al. ........... | 379/10 |
| 5,530,701 A | 6/1996 | Stillman et al. ........... | 370/94.1 |
| 5,533,093 A | 7/1996 | Horton et al. ................. | 379/21 |
| 5,701,400 A * | 12/1997 | Amado ......................... | 706/45 |
| 5,706,333 A | 1/1998 | Grenning et al. ............. | 379/59 |
| 6,446,058 B1 | 9/2002 | Brown ......................... | 706/60 |
| 2004/0038646 A1 * | 2/2004 | Bourgart .................. | 455/67.11 |

OTHER PUBLICATIONS

U.S. Appl. No. 09/955,624, filed Sep. 19, 2001, entitled "Expert System for Troubleshooting Radio Frequency Performance Problems", Inventors: Iyer.

* cited by examiner

*Primary Examiner*—Melur Ramakrishnaiah
(74) *Attorney, Agent, or Firm*—Merchant & Gould (57) ABSTRACT

A method of troubleshooting a cellular network problem is provided. The network problem and the facts regarding the problem are input. This input is sent to an inference engine which determines whether a rule is invoked by the input. If a rule is invoked by the input, the method will output potential sources of the problem and potential solutions to the problem. If no rule is invoked, the method will add the input to a provisional rules list which may be later converted to troubleshooting rules. If the output potential sources and solutions do not solve the problem, the method can also add the input to the provisional rules list for subsequent conversion.

11 Claims, 7 Drawing Sheets

┌─────────────────────────────────────────────────────┐
│ IF USERS ARE EXPERIENCING FAST BUSIES WHILE         │
│ TRYING TO MAKE A CALL FROM A CELL SITE              │
│ THEN IT CAN BE DUE TO                               │
│     *ANTENNAS IN THE CELL ARE DOWN                  │
│     *CELL SITE IS DOWN COMPLETELY                   │
│     *SEVERAL RADIOS IN THE CELL ARE NOT WORKING     │
│     *POWER SUPPLY TO THE CELL SITE IS DOWN          │
│ END IF                                              │
└─────────────────────────────────────────────────────┘
```

… # EXPERT SYSTEM FOR TROUBLESHOOTING CELLULAR SITE PROBLEMS

REFERENCE TO RELATED APPLICATIONS

This application is related to the subject matter disclosed in U.S. patent application Ser. No. 09/955,624, entitled "Expert System for Troubleshooting Radio Frequency Performance Problems" filed on Sep. 19, 2001, which is assigned to a common assignee and which is incorporated herein by reference.

FIELD OF THE INVENTION

This invention generally relates to cellular communications. More particularly, the present invention relates to an expert system for troubleshooting cellular network performance, such as cell site and switch problems.

BACKGROUND OF THE INVENTION

Cell site engineers solve a lot of problems pertaining to cellular sites and switches every day. When there is a problem with a cellular site or switch (such as a landline telephone switch or Mobile Switching Center (MSC)), a cell site engineer analyzes the problem, determines what is wrong and fixes the problem. The experience of the engineer is a major factor in how quickly the determination of what is wrong is made. A more experienced engineer is often able to determine what is wrong with a cell site or a switch faster than a less experienced engineer.

When an experienced cell site engineer leaves a company, the company loses a valuable asset. Less experienced engineers are no longer able to ask the experienced engineer for answers to cell site problems. Thus, there is a need for a method and system for maintaining the knowledge of experienced engineers so that the knowledge may be leveraged by other engineers. There is a further need for a computer-implemented method and system for analyzing problems with a cellular site or switch and presenting potential solutions based on historical data and collected data.

SUMMARY OF THE INVENTION

In one aspect, the present invention solves the above-described needs by providing an expert system for compiling and accessing historical data related to cellular network troubleshooting, in particular cellular site and switch troubleshooting. Data is compiled into a domain database for facts and a knowledge database for problems and potential solutions. In one embodiment of the invention, the data may be obtained by interviewing experienced engineers. Problems are typically symptoms that are experienced by a cellular telephone user or symptoms experienced at a cellular site. Potential solutions are system conditions that have been known to cause various problems and/or potential actions to be performed to remedy the problem. The problems and solutions are organized into expert system rules. An inference engine may process the rules and the facts to provide a list of potential solutions. A user can access the inference engine through a user interface. The user interface can be used to transmit facts and problems to the inference engine. The user interface can also display to the user potential solutions that are generated by the inference engine. The inference engine receives the facts and problems from the user interface and processes the input by accessing the knowledge database and the domain database. The user interface, the inference engine, the knowledge database, and the domain database, are collectively referred to herein as an expert system.

In another aspect of the present invention, a method of troubleshooting a cellular network problem is provided. The network problem and the facts regarding the problem are input. This input is sent to an inference engine which determines whether a rule is invoked by the input. If a rule is invoked by the input, the method will output potential sources of the problem and potential solutions to the problem. If no rule is invoked, the method will add the input to a provisional rules list which may be later converted to troubleshooting rules. If the output potential sources and solutions do not solve the problem, the method can also add the input to the provisional rules list for subsequent conversion.

These and other features, advantages, and aspects of the present invention may be more clearly understood and appreciated from a review of the following detailed description of the disclosed embodiments and by reference to the appended drawings and claims.

DETAILED DESCRIPTION

In one aspect, the present invention solves the above-described needs by providing an expert system for compiling and accessing historical data related to cellular network troubleshooting, in particular cellular site and switch troubleshooting. Data is compiled into a domain database for facts and a knowledge database for problems and potential solutions. In one embodiment of the invention, the data may be obtained by interviewing experienced engineers. Problems are typically symptoms that are experienced by a cellular telephone user or symptoms experienced at a cellular site. Potential solutions are system conditions that have been known to cause various problems and/or potential actions to be performed to remedy the problem. The problems and solutions are organized into expert system rules. An inference engine may process the rules and the facts to provide a list of potential solutions. A user can access the inference engine through a user interface. The user interface can be used to transmit facts and problems to the inference engine. The user interface can also display to the user potential solutions that are generated by the inference engine. The inference engine receives the facts and problems from the user interface and processes the input by accessing the knowledge database and the domain database. The user interface, the inference engine, the knowledge database, and the domain database, are collectively referred to herein as an expert system.

In another aspect of the present invention, a method of troubleshooting a cellular network problem is provided. The network problem and the facts regarding the problem are input. This input is sent to an inference engine which determines whether a rule is invoked by the input. If a rule is invoked by the input, the method will output potential sources of the problem and potential solutions to the problem. If no rule is invoked, the method will add the input to a provisional rules list which may be later converted to troubleshooting rules. If the output potential sources and solutions do not solve the problem, the method can also add the input to the provisional rules list for subsequent conversion.

Exemplary Cellular Environment

Having briefly described an embodiment of the present invention, an exemplary operating environment for the present invention is described below in reference to FIG. 1. Referring now to the drawings, in which like numerals represent like elements throughout the several figures, aspects of the present invention will be described.

Figure 1:
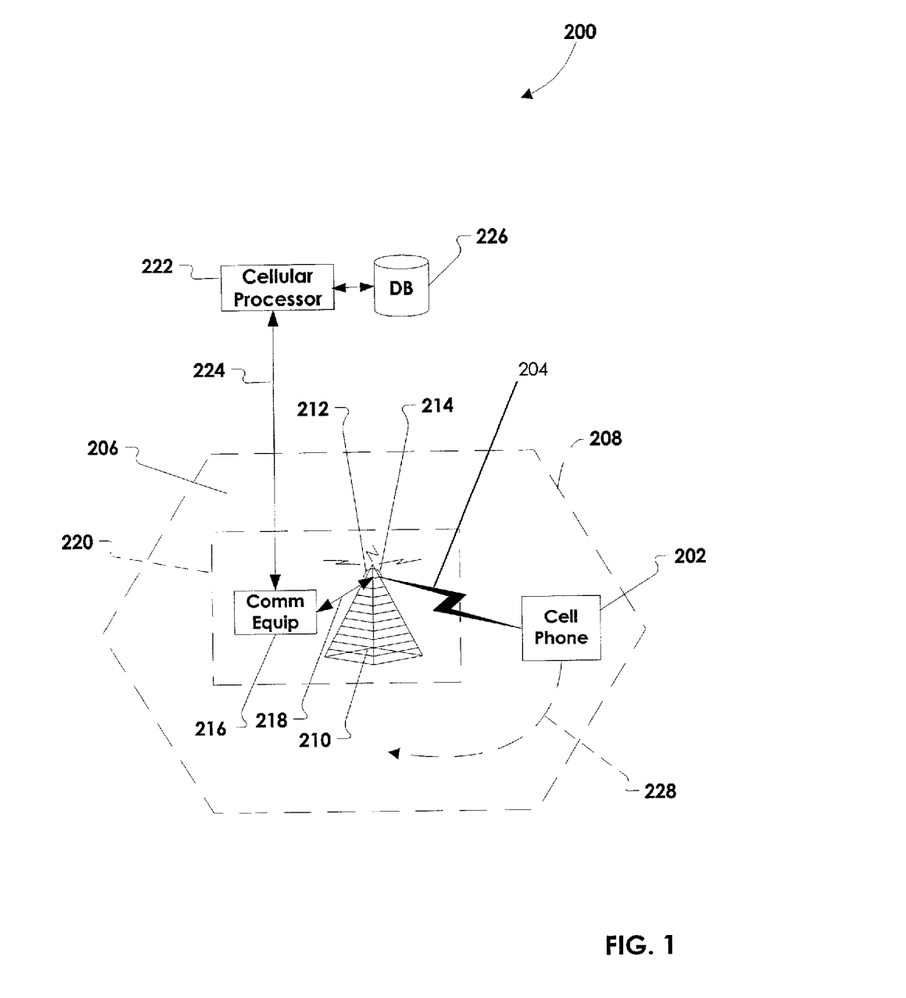
FIG. 1 illustrates an exemplary cellular operating environment.

FIG. 1 illustrates an exemplary cellular environment 200 well-known to those skilled in the art. The environment 200 is generally a cellular telephone system for receiving and transmitting cellular phone calls. A cellular phone 202 is transmitting a signal 204 within a cell 206. The cell 206 is a geographic area generally defined by a boundary 208. The cell includes an antenna tower 210 that has transmitters and receivers for transmitting and receiving signals. The transmitters on the antenna tower 210 transmit at a designated power level. Likewise, the cell phone 202 transmits the signal 204 at a designated power level. The designated power levels of the antenna tower transmitters and the cell phone 202 dictate the location of the boundary 208 of the cell 206. Receivers on the antenna tower 210 will generally receive the signal 204 while the cell phone 202 is within the boundary 208 of the cell 206. Generally, when the cell phone 202 leaves the boundary 208 of the cell 206, the receiver of the antenna 210 will no longer receive the signal 204. In one embodiment, the cell boundary 208 is substantially hexagonal in shape.

A receiver on the antenna tower 210 is generally referred to as a cell face. The antenna tower 210 may have more than one cell face, such as a cell face 212 and cell face 214. A typical antenna tower has three cell faces, but the number of cell faces can vary. Each cell face on the antenna tower 210 is positioned so that it covers an area within the cell 206. Depending on the positioning and the orientation of the cell face 214, the cell face 214 will receive calls coming from a particular direction. The cell face 212 is oriented in a different position to receive calls coming from a different direction with respect to the antenna tower 210. A variety of cell face configurations are known in the art. For example, one cell face configuration is known as the omni face, which comprises a single cell face with a coverage area of 360 degrees around the antenna tower. A common cell face configuration includes three cell faces with each cell face having a coverage area of 120 degrees around the antenna tower. Typically a structure 216 is located near the antenna tower that houses communications equipment, such as radio transmitters, radio receivers, and power supplies. The communications equipment is connected to transmitters and cell faces on the antenna tower via a communications link 218. The structure 216 and the antenna tower 210 are commonly referred to as a base station 220. The base station 220 is located substantially in the middle of the cell 206.

Each cell face on the antenna tower 210 has an associated transmitter. Transmitters transmit control signals on unique control channels or frequencies that are used to send control messages to the cell phone 202. When the cell phone 202 is in operation, the cell phone 202 searches for the strongest control signal coming from the antenna tower 210. The receiver in the cell phone 202 locks on to the strongest control channel and begins receiving control information. The control information includes the transmission frequency at which the cell phone 202 should transmit. In the exemplary environment 200, when the cell phone 202 begins operation, it receives the strongest control signal from a transmitter associated with the cell face 214. Thus, as depicted in FIG. 1, the signal 204 from the cell phone 202 is being received by the cell face 214. The cell phone 202 may transmit using any of a number of communications protocols known in the art. The signal 204 will follow the protocol used by the cell phone 202. For example, the cell phone 202 may utilize an analog protocol known as Advanced Mobile Phone System (AMPS). Alternatively, the cell phone 202 may use a digital protocol, such as Time Division Multiple Access (TDMA).

The communications equipment 216 receives the signal 204 and may demodulate the signal. The communications equipment 216 typically is operable to receive signals in a variety of formats, including AMPS and TDMA. The signal 204 is sent to a cellular processor 222 via a communications link 224. The cellular processor 222 is typically a sophisticated computing device operable to manage cellular communications at the antenna tower 210. For example, the cellular processor 222 can monitor the signal strength of the signal 204. Also, the cellular processor 222 can detect when the cell phone 202 has been disconnected to terminate the call 204. The cellular processor 222 may also facilitate billing and locating the cell phone 202. One example of a cellular processor known in the art is the Executive Cellular Processor (ECP) manufactured by Lucent. Many other cellular processors are known in the art. The cellular processor 222 utilizes a database 226 to perform its functions. One particular function that the cellular processor 222 performs is determining which of the cell faces on the antenna tower 210 should optimally be used to receive the signal 204.

When the cell phone initially places a call 204, the cell phone 204 may be located in the coverage area of the cell face 214. Thus, the cell face 214 may have been optimal at the beginning of the conversation. However, the user of the cell phone 202 may be moving while the conversation is taking place. While the cell phone 202 moves in a direction 228, the signal strength of the signal 204 will vary with respect to the cell faces 212 and 214. The cellular processor 222 detects the variation in signal strength of the signal 204. As the cell phone 202 moves in the direction 228, it moves away from the cell face 214 and closer to the cell face 212. The cellular processor 222 detects a decrease in the signal power received by the cell face 214. Eventually, as the cell phone 202 continues to move, signal power received by the cell face 214 will be less than a minimum required level. In response, the cellular processor 222 accesses the database (in particular a neighbor list) 226 to determine which cell face the signal 204 can be transferred to.

The cellular processor 222 accesses the neighbor list in the database 226. The neighbor list is generally a list of cell faces to which a signal may be transferred or handed off. For example, the database 226 has a neighbor list associated with the cell face 214. The neighbor list for cell face 214 provides a list of available cell faces where the signal 204 can be transferred. In the example shown in FIG. 1, the cell face 212 is among the available cell faces given in the cell face transfer data for the cell face 214. After the cellular processor 222 identifies the cell face 212 as the optimal cell face, the cellular processor 222 sends a message to the communications equipment 216 indicating that the cell phone 202 should begin transmitting at a frequency associated with the cell face 212. In response to a message from the cellular processor 222, the transmitter for the cell face 214 transmits a control signal to the cell phone 202 that instructs the cell phone to switch to a frequency associated with the cell face 212. The process of transferring the cell phone signal 204 from the cell face 214 to the cell face 212 is extremely fast. There is no break in the conversation recognizable by the user of the cell phone 202. The process of transferring a signal from one cell face to another is referred to as handing off the call.

Figure 2:
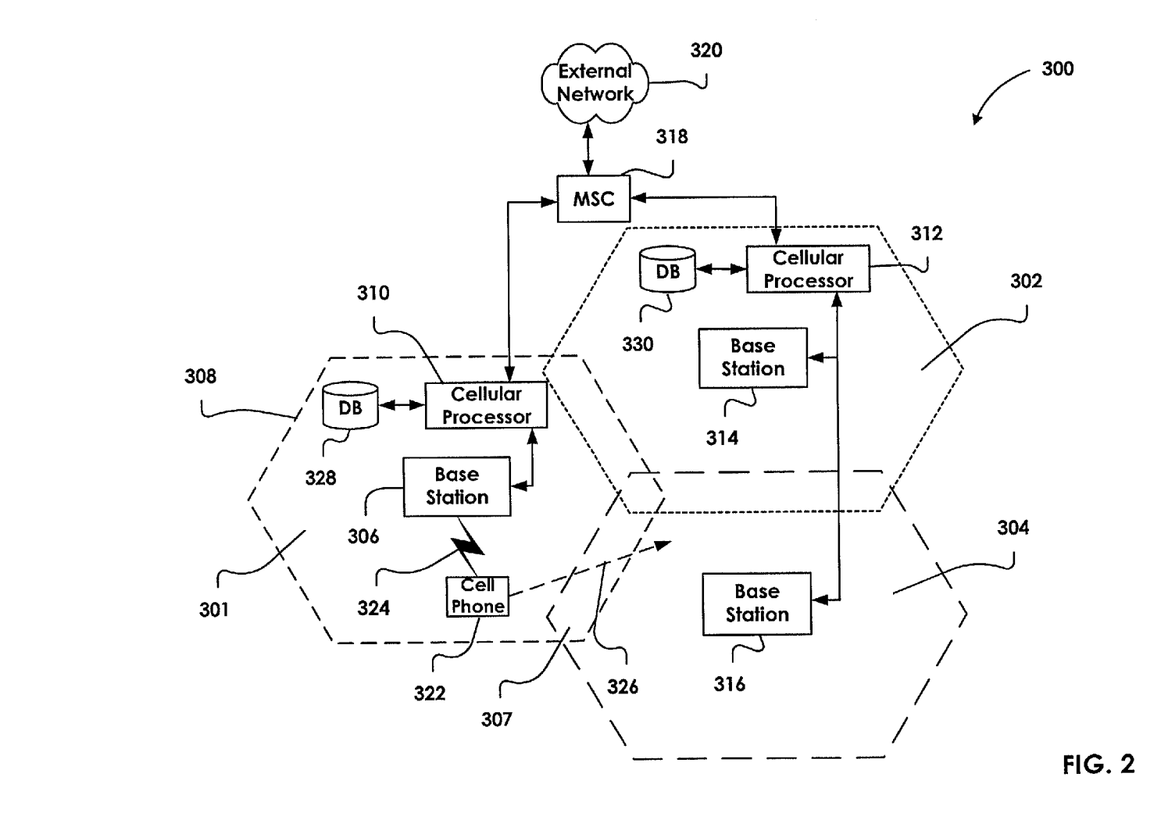
FIG. 2 illustrates an exemplary multiple cell operating environment.

FIG. 2 illustrates a multiple cell operating environment 300 well-known to those skilled in the art. The environment can include one or more cells, such as cell 301, cell 302, cell 304. Cells are often referred to as cellsites or simply sites. Typically, each cell has an associated cell identification number used to identify the cell. Each cell has a base station, such as base station 306. The cell 302 has a base station 314 and cell 304 has a base station 316. Like the base station 220 of FIG. 1, the base stations 306, 314, and 316 each include radio equipment and an antenna tower having one or more cell faces. Cells 301, 302 and 304 may, but do not necessarily, overlap, as shown by an overlapping region 307. In one embodiment, the cell 301 has a coverage area defined by a substantially hexagonal boundary 308. During operation, a cellular processor 310 communicates with the base station 306 to monitor calls within the cell 301. Another cellular processor 312 communicates with the base station 314 and the base station 316 to monitor calls within cell 302 and cell 304 respectively. A typical cellular processor may be associated with 100 or more cells and base stations. The environment illustrated in FIG. 2 is exemplary only and the systems and methods described can generally be applied to environments including hundreds of cells.

As has been discussed, cellular processors, such as cellular processor 310 and cellular processor 312 typically monitor various data about cellular phone calls, such as signal strength, cell phone location, and billing. The cellular processors 310 and 312 also transmit signals to a mobile switching center (MSC) 318. The MSC 318 relays cell phone signals to an external network 320, such as a telephone wireline network. The MSC 318 is a sophisticated system that is in communication with networks and switches around the world to determine an optimal route for cell phone calls to reach their destination.

In the exemplary environment 300, a mobile communication device, such as a cell phone 322, is shown in the cell 301 transmitting a signal 324 to the base station 306. The signal 324 transmits voice data over a voice channel to a cell face at the base station 306. The base station 306 receives the signal 324 and transmits it to the cellular processor 310 so that the cellular processor 310 can monitor the signal 324. The cellular processor 310 may also transmit the signal 324 to the MSC 318, which may route the signal to the external network 320. The cell phone 322 may utilize any communications technology known in the art and the signal 324 may follow any protocol known in the art. Communications technologies include, but are not limited to, Code Division Multiple Access (CDMA), Advanced Mobile Phone System (AMPS), Global System for Mobile Communications (GSM), and Time Division Multiple Access (TDMA). Preferably, the base station 306 is operable to receive any or all of the possible communications technologies. The base station is configured to each technology—the radios are either analog or digital. An analog radio cannot handle digital calls. If the radio is a TDMA radio, it will not be able to handle GSM or CDMA calls.

As shown in FIG. 2, the cell phone 322 is traveling in a direction 326. The cell phone 322 is moving in the cell 301 toward the cell 304. As the cell phone 322 travels, it maintains communications with the base station 306 and the cellular processor 310 monitors the strength of the signal 324. As the cell phone 322 moves farther from the base station 306, the cellular processor 310 may detect that the strength of the signal 324 diminishes or weakens. The cell phone 307 travels through the overlapping region 307 where cell 304 and cell 301 overlap. When the signal strength of the signal 324 drops below a minimum power level, the cellular processor 310 accesses a neighbor list in a database 328 to determine an available cell face for a hand off. The database 328 contains a plurality of neighbor lists. Each neighbor list is associated with a cell face at a cell. Preferably each neighbor list has a cell identifier and a cell face identifier for the associated cell face. The cellular processor 310 reads cell face transfer data entries from the neighbor list that identify an available transfer cell face for a hand off. Handing off a call generally means transferring the call from one cell face to another cell face.

Cell face transfer data may be updated when a new cell such as cell 304 is implemented. For example, cell 304 and its associated base station 316 may be put into service after the cells 301 and 302 are operating. When the base station 316 is put into service, a plurality of new cell faces associated with base station 316 are made available to offer mobile communication service that was not existent prior to implementation of cell 304. As a result of the implementation of cell 304, data in the databases 328 and 330 may be updated to reflect the addition of cell 304. As an example, a call in cell 301 traveling into cell 304 may be handed off to a cell face of the base station 316. The cellular processor 312 will monitor the mobile telephone user's call for various parameters including signal strength. As the traveler travels from the cell 301 toward the cell 304, the signal strength from the call may diminish. The cellular processor 312 will send a signal to the base station 306 to initiate a hand-off to transfer the call to a cell face of the base station 316. The cellular processor 310 accesses the cell face transfer data stored in the database 328. The cellular processor 310 uses cell face transfer data in the database 328 to identify cell faces that are available for the call 324 to be handed-off.

An embodiment of the present invention is an expert system for troubleshooting problems in cellular environments such as those described in FIGS. 1 and 2. Experts systems are well-known to those skilled in the art and will be briefly described below.

Expert Systems

Conventional programming languages, such as FORTRAN and C, are designed and optimized for the procedural manipulation of data (such as numbers and arrays). Humans, however, often solve complex problems using abstract, symbolic approaches which are not well-suited for implementation in conventional languages. Although abstract information can be modeled in these languages, considerable programming effort is required to transform the information to a format usable with procedural programming paradigms.

One of the results of research in the area of artificial intelligence has been the development of techniques which allow the modeling of information at higher levels of abstraction. These techniques are embodied in languages or tools which allow programs to be built that closely resemble human logic in their implementation and are therefore easier to develop and maintain. These programs, which emulate human expertise in well-defined problem domains, are called expert systems. Expert systems are well-known to those skilled in the art. The availability of expert system tools has greatly reduced the effort and cost involved in developing an expert system.

Rule-based programming is one of the most commonly used techniques for developing expert systems. In this programming paradigm, rules are used to represent heuristics, or "rules of thumb", which specify a set of actions to be performed for a given situation. A rule is composed of an if portion and a then portion. The if portion of a rule is a series of patterns which specify the data which cause the rule to be applicable. The process of matching this data to patterns is called pattern matching. The expert system tool provides a mechanism, called the inference engine, which automatically matches data against patterns and determines which rules are applicable. The if portion of a rule can actually be thought of as the whenever portion of a rule because pattern matching always occurs whenever changes are made to data. The then portion of a rule is the set of actions to be executed when the rule is applicable. The actions of applicable rules are executed when the inference engine is instructed to begin execution. The inference engine selects a rule and then the actions of the selected rule are executed (which may affect the list of applicable rules by adding or removing data). The inference engine then selects another rule and executes its actions. The process may continue until no applicable rules remain.

Having briefly described expert systems above, a description of an expert system in accordance with an embodiment of the present invention will be described below in reference to FIG. 3.

Expert System for Troubleshooting Cellular Site Problems

Figure 3:
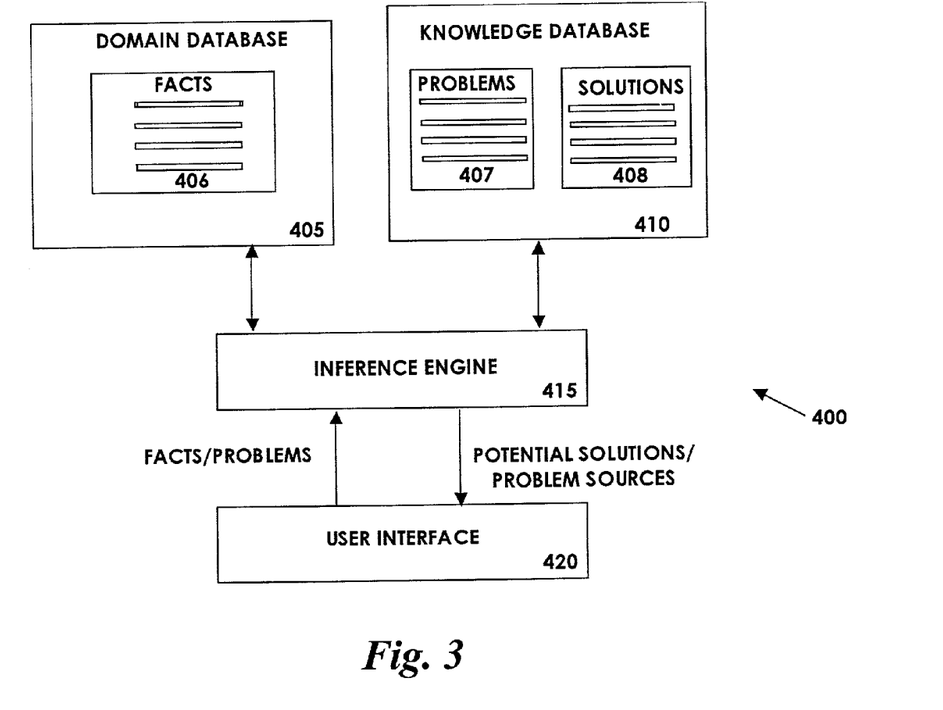
FIG. 3 is a block diagram illustrating an expert system for troubleshooting cellular site problems in accordance with an embodiment of the present invention.

Referring now to FIG. 3, an expert system 400 for troubleshooting cellular site problems in accordance with an embodiment of the present invention will be described. In one embodiment, the expert system 400 may be used to troubleshoot cellular site and switch (landline or MSC) problems associated with a cellular system such as the cellular operating environments illustrated in FIGS. 1 and 2.

For example, a cellular site problem may occur as follows. Suppose cellular customers are reporting fast busy signals while their cellular phones are operating at a certain cellular site. A cellular site engineer may be sent to look at the problem and may determine that some of the radios at the cellular site are not working. As another example, a switch problem may be a problem in the hardware or software of the switch.

The expert system 400 comprises a user interface 420. It should be understood that the expert system 400 is a computer-implemented system and the user interface provides a mechanism for a user to input data into the expert system and receive data from the expert system. The user interface provides for communication exchange between the system user and the expert system. Through the user interface, the user can enter relevant facts and problems and can request solutions from the expert system. In one embodiment, the user interface allows a user to type in the problems associated with a cellular site or a switch and the system will respond by displaying a solution to the problem. Of course, other input mechanisms and user interfaces well-known to those skilled in the art may be used as part of the expert system.

Facts and problems may be entered using the user interface 420 and passed to an inference engine 415. The inference engine may be a software application that performs the inference reasoning tasks for the expert system. The inference engine 415 is the portion of the expert system 400 that contains the strategies for controlling the selection and application of rules and facts that are stored in a knowledge database 410 and a domain database 405. The inference engine is the part of the expert system where the reasoning actually takes place. The inference engine considers the form of the problem, the theorem to be proved or the question to be answered and the relevant portions of the knowledge database and the domain database. The inference engine receives user queries, searches the database for solutions and reports the solutions back to the user through the user interface. The inference engine may also use the knowledge in the expert system's database and information provided by the user to infer new knowledge. The inference engine may be written using the PROLOG language or another well-known logic programming language.

As mentioned above, the expert system 400 also comprises a knowledge database 410 and a domain database 405. The knowledge database 410 comprises a plurality of rules (which are problems 407 and solutions 408 to those problems). The rules may comprise a plurality of if-then statements.

The domain database 405 is a database of facts 406, such as facts that apply to a particular problem. For example, if a particular cell site is having problems, then a fact may be that the cellular site has three cell faces and that the cellular site has three radios. Other examples of facts are cell location, cell type, cell manufacturer, cell latitude, cell longitude, cell status, trunk group, number of radios, setup channel number, protocol version, mobile access threshold, directed retry list, handoff retry list, radio locations, radio status, just to name a few.

In one embodiment of the invention, the knowledge database and domain database are populated via a knowledge acquisition facility (KAF) (not shown). The KAF may be a software application that provides a dialogue between the expert system 400 and the human experts for the purpose of acquiring knowledge from the human experts. The KAF places this acquired knowledge in the system's knowledge database 410 and domain database 405. For example, the KAF may ask the human expert (in this case a cell site engineer) a question such as "What are the possible sources of a fast busy signal when a cellular site has three faces?". The KAF will then use the responses from the human expert to formulate a number of if-then statements (rules) which are stored in the knowledge database. The KAF may also use the fact scenario (that the cellular site has three faces) to populate the domain database. In another embodiment, domain and knowledge databases may also be created by interviewing experienced engineers regarding problems they have solved over the years and the solutions they found. Instead of a KAF, a Knowledge Engineer will interview the cell site engineers about their experiences solving problems. The cell site engineers will give the Knowledge Engineer a list of problems that they have solved (problems and solutions). The Knowledge Engineer uses the problems and solutions to store rules in the expert system. The Knowledge Engineer may use LISP, PROLOG, or any other Artificial Intelligence Languages to write a computer software program to help store the rules. The inference engine 415 may also be built by the Knowledge Engineer.

Figure 4:
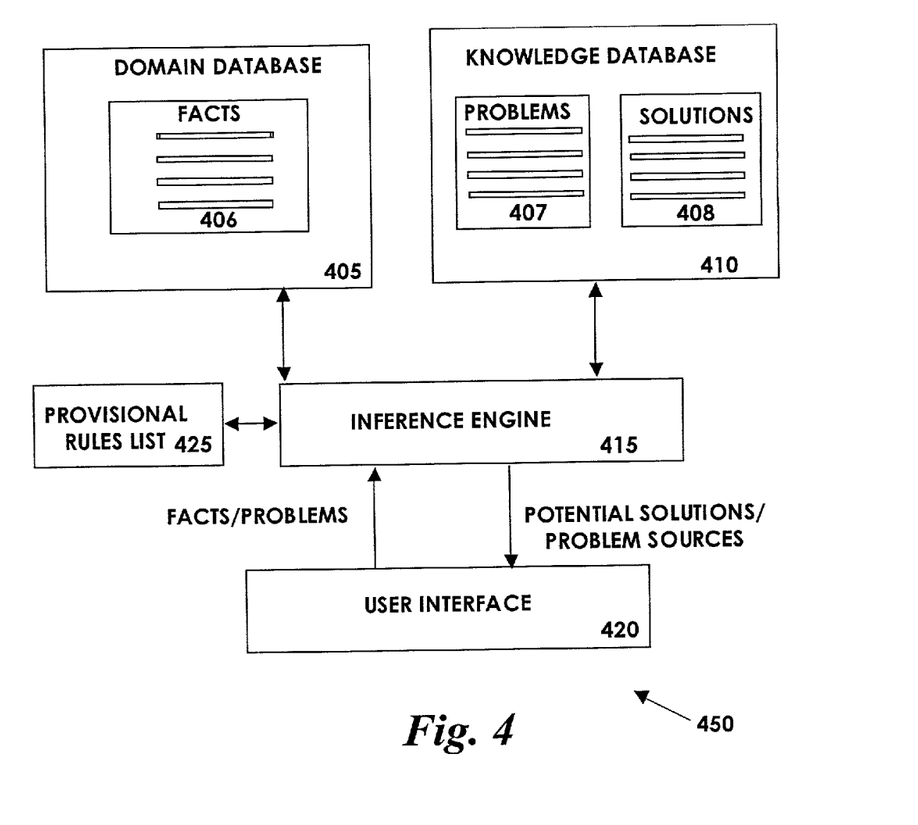
FIG. 4 is a block diagram illustrating an expert system for troubleshooting cellular site problems in accordance with another embodiment of the present invention.

Referring now to FIG. 4, an illustration of an expert system 450 for troubleshooting cellular site problems in accordance with another embodiment of the present invention will be described. The expert system 450 comprises a knowledge database 410, a domain database 405, a user interface 420 and an inference engine 415 as described in reference to FIG. 3. However, the expert system 450 also comprises a provisional rules list 425. After the databases are constructed initially, more facts and rules may be added as new problem solutions are found. Also, it may be necessary to modify the existing rules in some cases. The provisional rules list provides a means for storing facts and problems for which solutions have not been found yet. As solutions to these problems are found, the problems and solutions may be converted to rules and stored in the knowledge database and the facts associated with the rules may be stored in the domain database.

Figure 5:
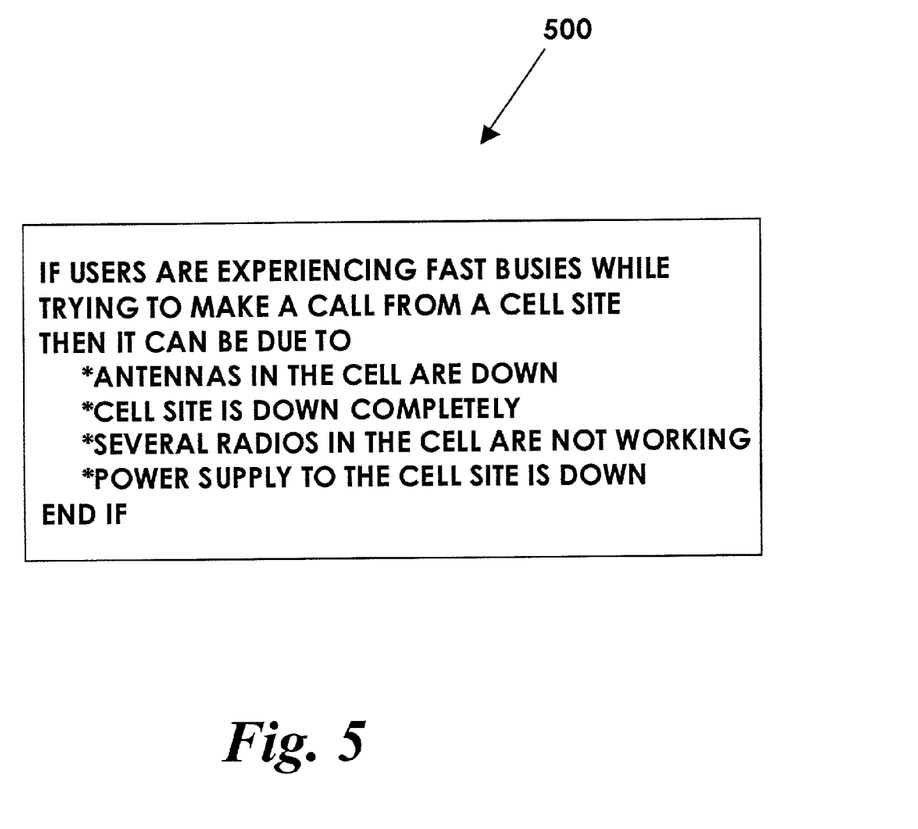
FIG. 5 is a block diagram illustrating a rule stored in a knowledge database in accordance with an embodiment of the present invention.

Referring now to FIG. 5, an illustration of a rule 500 stored in the knowledge database 410 will be described. The rule 500 comprises an if-then statement. The if portion of the statement corresponds to the problem 407, such as "cell phone user experiences fast busy". The then portion of the statement corresponds to potential solutions or potential problem sources (408) such as "antennas in the cell are down, cell site is down completely, etc." It should be understood that the rule 500 may comprise a plurality of nested if-then statements to provide the logic desired.

Figure 6:
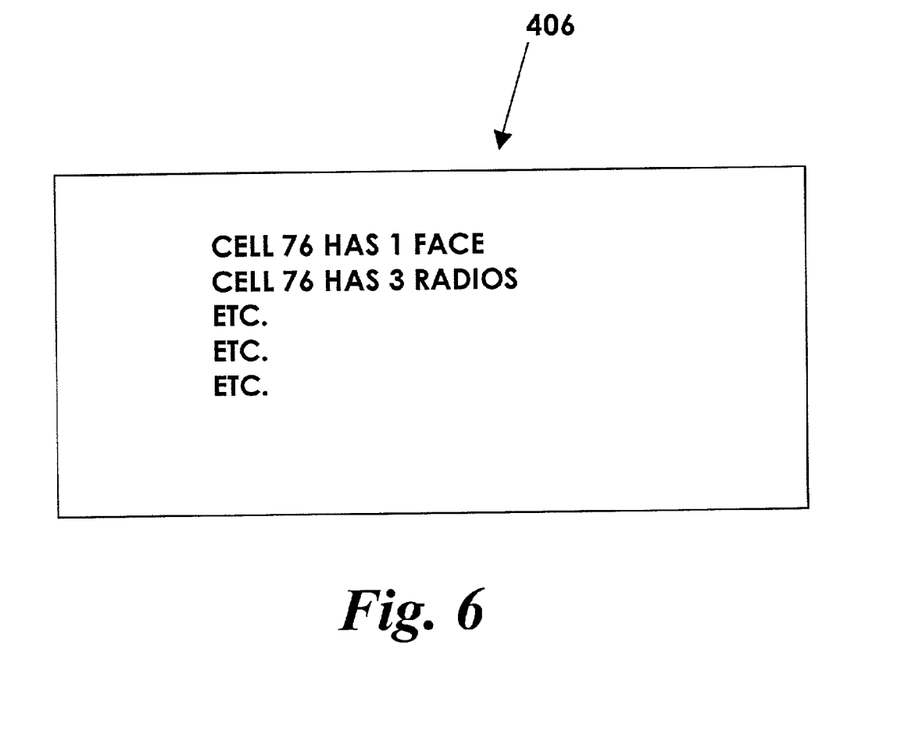
FIG. 6 is a block diagram illustrating a fact stored in a domain database in accordance with an embodiment of the present invention.

Referring now to FIG. 6, an illustration of a fact 406 stored in the domain database 405 will be described. The fact 406 lists data that may be used by the expert system in association with a rule to determine a potential solution or problem source for the problem.

Method for Troubleshooting a Cellular Network Problem

Figure 7:
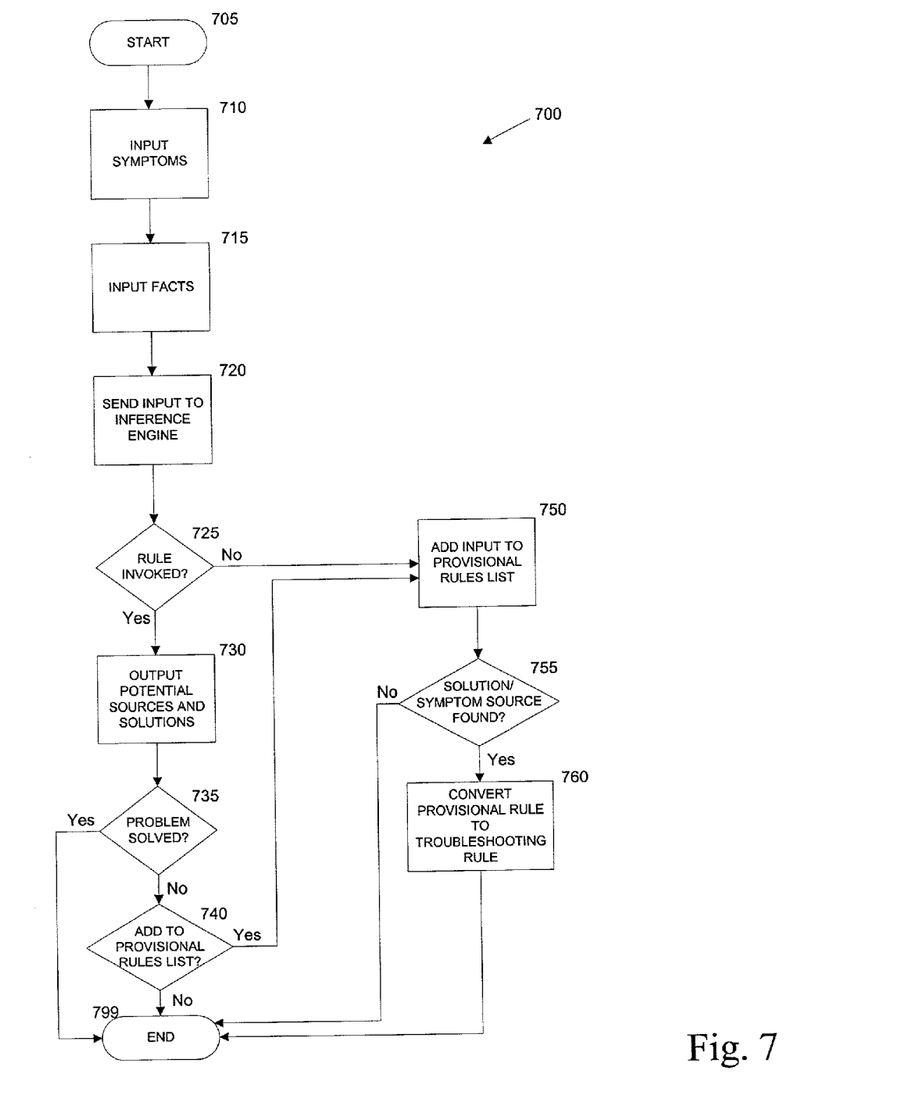
FIG. 7 is a flow diagram illustrating a computer-implemented method for troubleshooting a cellular network problem.

Referring now to FIG. 7, a flow diagram illustrating a computer-implemented method 700 for troubleshooting a cellular network problem in accordance with an embodiment of the present invention will be described. In a preferred embodiment, the method is implemented using an expert system such as the expert system 400 (FIG. 3) or expert system 450 (FIG. 4).

The method 700 begins at start step 705 and proceeds to step 710 where a user inputs (using the user interface) a symptom (or problem) that is being experienced at the cellular site or switch. In one embodiment of the invention, the user may enter the symptom into a field in the user interface. In another embodiment, the user may select a symptom from a list of symptoms. In yet another embodiment, the user may enter the symptoms in a natural language format. For example, the user may enter that "the cell user is experiencing a fast busy signal". Of course, other well-known user interface techniques may also be used to enter the symptom at step 710. The method then proceeds to step 715.

At step 715, the user inputs (using the user interface) facts regarding the cellular site or switch. The method then proceeds to step 720.

At step 720, the symptoms and facts input at steps 710 and 715 are sent to the inference engine.

At decision step 725, the inference engine determines whether a rule is invoked by the symptom and facts inputs. The inference engine may be a computer program that takes users input about a problem, looks over the knowledge database for answers and reports the answers back to the user. If no rule is invoked, then the method 700 proceeds to step 750 where the symptoms and facts input are added to the provisional rules list. However, if a rule is invoked at decision step 725, then the method 700 proceeds to step 730.

At step 730, the potential sources of the problem and/or potential solutions to the problem are output to the user interface. The method then proceeds to decision step 735.

At decision step 735, a prompt in the user interface asks the user whether the problem was solved. If so, then the method ends at step 799. However, if the problem was not solved, then the method proceeds to decision step 740.

At decision step 740, a prompt in the user interface asks the user whether the symptoms and facts input should be added to the provisional rules list. If not, then the method ends at step 799. However, if the user does wish to add the symptoms and facts to the provisional rules list, then the method proceeds to step 750 where the symptoms and facts are added to the provisional rules list.

The method then proceeds to decision step 755 where it is determined whether the user has entered a potential solution to the problem/source of the problem. If not, then the method ends at step 799. However, if the user has determined a potential solution to the problem/source of the problem, then the method proceeds to step 760.

At step 760, then user inputs the potential solution/source of the problem and the provisional rule is converted to a troubleshooting rule in the knowledge database, such as by a knowledge engineer converting the rule. The method then ends at step 799.

Although the present invention has been described above as implemented in preferred embodiments, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for troubleshooting a problem associated with a cellular network site, comprising:
   receiving a symptom input describing the symptoms of the problem associated with the cellular network site;
   determining whether at least one of a plurality of rules is invoked by the symptom input, wherein the plurality of rules comprise a plurality of if-then statements, wherein the plurality of if-then statements comprise a plurality of if portions and a plurality of then portions, the then portions corresponding to potential solutions to the problem, and wherein at least a portion of the plurality of rules is generated by a software application for interviewing cellular network site engineers;
   if so, then outputting a potential solution to the problem wherein the potential solution is determined by the invoked rule; and
   storing the symptoms in a provisional rules list when none of the plurality of rules are invoked.

2. The method of claim 1 wherein determining whether at least one of a plurality of rules is invoked by the symptom input comprises determining whether the symptom input matches one of the plurality of if portions; and if so, then determining that the rule associated with the matched if portion is invoked.

3. The method of claim 1 wherein outputting a potential solution to the problem comprises outputting the then portion of the invoked rule.

4. The method of claim 3 wherein outputting a potential solution to the problem comprises displaying the potential solution in a user interface of a computing device.

5. The method of claim 1 further comprising receiving a facts input describing relevant facts regarding the cellular network and wherein determining whether at least one of a plurality of rules is invoked by the symptom input further comprises determining whether at least one of a plurality of rules is invoked by the symptom input and the facts input.

6. The method of claim 5 further comprising:
receiving an indication input indicating whether the potential solution was successful.

7. The method of claim 6 further comprising:
receiving a potential solution input; and
adding the symptom input and potential solution input as one of the plurality of rules stored in a knowledge database.

8. The method of claim 1 further comprising:
receiving a potential solution input; and
adding the symptom input and potential solution input as one of the plurality of rules stored in a knowledge database.

9. An expert system for troubleshooting a problem in a cellular network site, the expert system comprising:
a user interface for transmitting and receiving data to and from the expert system;
an inference engine connected to the user interface, wherein the inference engine receives data from the user interface and transmits data to the user interface;
a knowledge database connected to the inference engine, wherein the knowledge database comprises a plurality of rules used to provide potential solutions to the problem, wherein the plurality of rules comprise a plurality of if-then statements wherein the if portion corresponds to the problem and the then portion corresponds to a potential solution, and wherein at least a portion of the knowledge database is populated with the plurality of rules using a knowledge acquisition facility (KAF) comprising a software application for interviewing cellular network site engineers, wherein the knowledge database stores symptoms of a problem in a provisional rules list when none of the plurality of rules are invoked; and
a domain database, wherein the domain database comprises a plurality of facts regarding the cellular network site.

10. The expert system of claim 9 wherein the KAF formulates a plurality of if-then statements from the interviews with the cellular network site engineers wherein the plurality of if-then statements are stored as the plurality of rules in the knowledge database.

11. A computer-readable medium having computer-executable instructions which, when executed on a computer, cause the computer to perform a method for troubleshooting a problem associated with a cellular network site, the method comprising:
receiving a symptom input describing the symptoms of the problem associated with the cellular network site;
determining whether at least one of a plurality of rules is invoked by the symptom input, wherein the plurality of rules comprise a plurality of if-then statements, wherein the plurality of if-then statements comprise a plurality of if portions and a plurality of then portions, the then portions corresponding to potential solutions to the problem, and wherein at least a portion of the plurality of rules is generated by a software application for interviewing cellular network site engineers;
if so, then outputting a potential solution to the problem wherein the potential solution is determined by the invoked rule; and
storing the symptoms in a provisional rules list when none of the plurality of rules are invoked.

* * * * *